United States Patent [19]
Sickles

[11] 3,933,413
[45] Jan. 20, 1976

[54] DRIVE MECHANISM FOR A SPIRAL ARRAY OF INDIVIDUAL FILM PHOTOGRAPHS

[76] Inventor: Ralph A. Sickles, 1418 E. Steamboat Bend, Tempe, Ariz. 85253

[22] Filed: Mar. 22, 1974

[21] Appl. No.: 453,725

[52] U.S. Cl. .............................. 353/110; 352/103
[51] Int. Cl.² ................. G03B 23/10; G03B 25/00
[58] Field of Search ......... 353/110, 25, 19; 352/103

[56] References Cited
UNITED STATES PATENTS

| | | | |
|---|---|---|---|
| 1,236,819 | 8/1917 | Bulask et al. .................. | 352/103 |
| 2,093,033 | 9/1937 | Coullery ........................ | 352/103 |
| 2,373,392 | 4/1945 | Griswold ....................... | 353/110 |
| 3,322,035 | 5/1967 | Admon .......................... | 353/110 |

FOREIGN PATENTS OR APPLICATIONS

| | | | |
|---|---|---|---|
| 851,381 | 10/1960 | United Kingdom................. | 353/110 |

*Primary Examiner*—Richard E. Aegerter
*Assistant Examiner*—Steven L. Stephan

[57] ABSTRACT

A drive mechanism for a spiral array of individual film photographs comprising a rotary driving plate having a spiral array of switch operating portions adapted to energize a driving motor for driving the driving plate; rotary axis means coupled to said driving plate; a photographic mount coupled to said rotary axis means and carrying a spiral array of individual photographs. A rectilinear bearing means on said frame adapted to guide said rotary axis means and said rotary driving plate together with said photographic mount in a rectilinear path laterally of the rotary axis of said rotary axis means, and mounting means carrying a track follower adapted to operate said switch and engagable with said switch operating portions. The track follower engaging a spiral track means on the rotary driving plate and serving to index said plate relative to said swith operating portions and also to activate said rotary driving plates in a direction along said rectilinear bearing means. The disclosure also relating to novel pawl means adapted to operate a single revolution at a time according to energization of a reduction gear motor for moving said rotary driving plate from one switch operating portion to the next one for controlling successive energization and movement of said pawl.

Additionally, the disclosure relates to specific details of the switch operating portions arranged in a spiral array on the rotary driving member and the relative geometry and spacing of the switch operating portions relative to rectangular photographs carried by the photographs mount of the invention. Additionally, the disclosure relates to an indicator arm used in conjunction with the foregoing rotary driving plate and photograph mount for moving the rotary driving plate and the photograph mount manually in a direction along a rectilinear path on the frame for reseting the rotary driving plate and respective individual photographs relative to an exposure area maintained in stationary position on the frame which carries the rectilinear bearing means.

20 Claims, 11 Drawing Figures

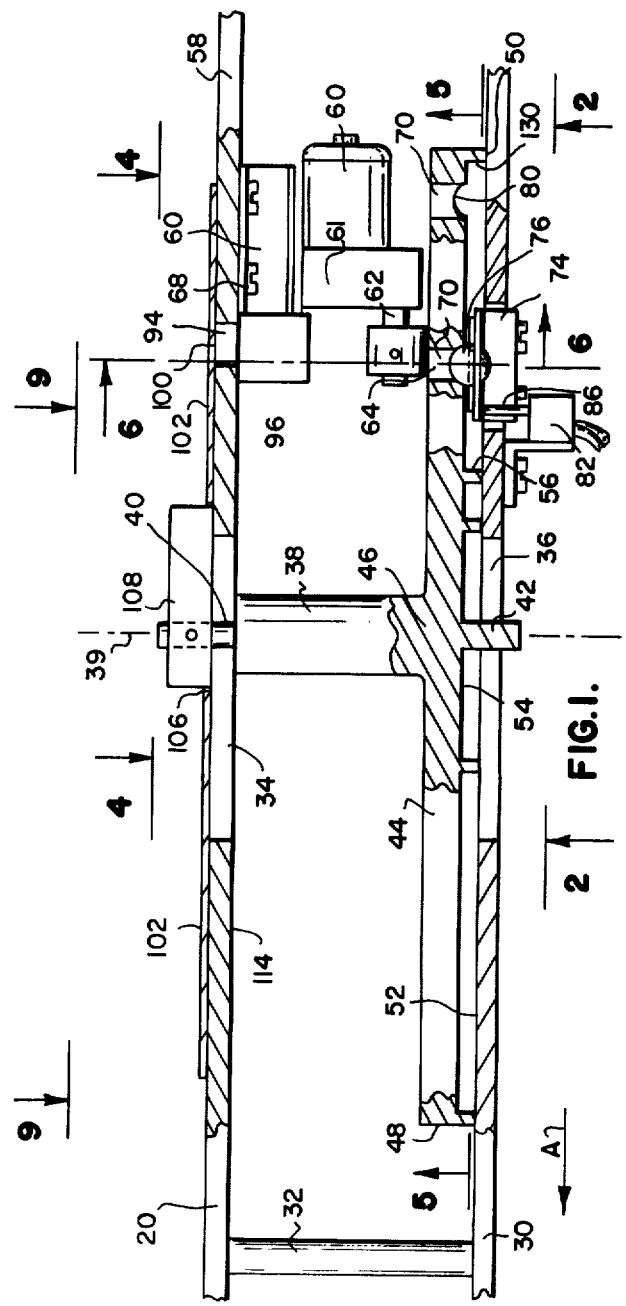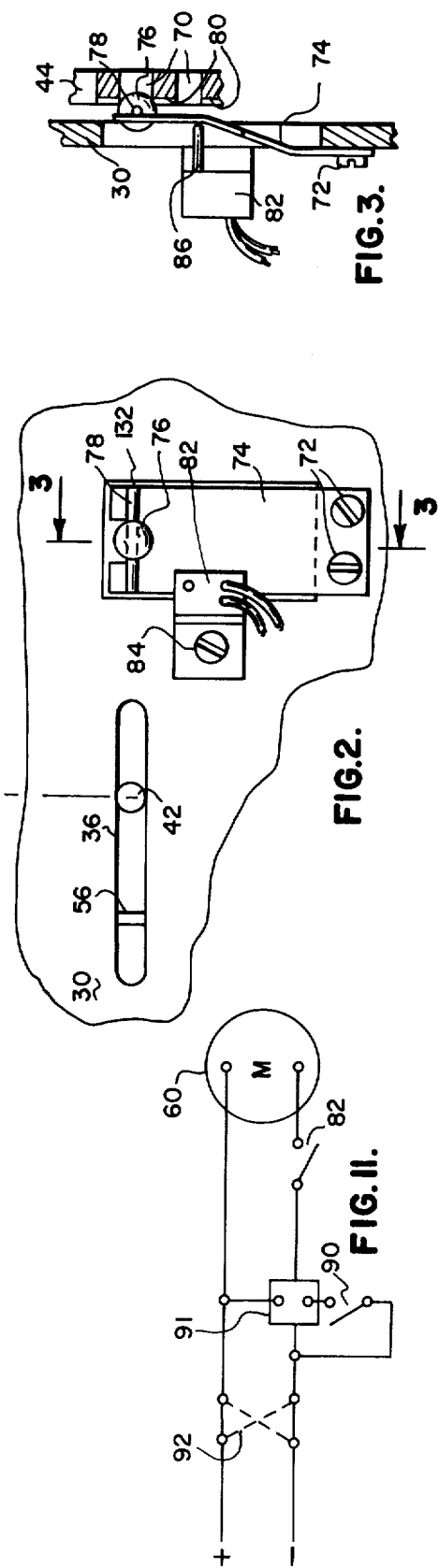

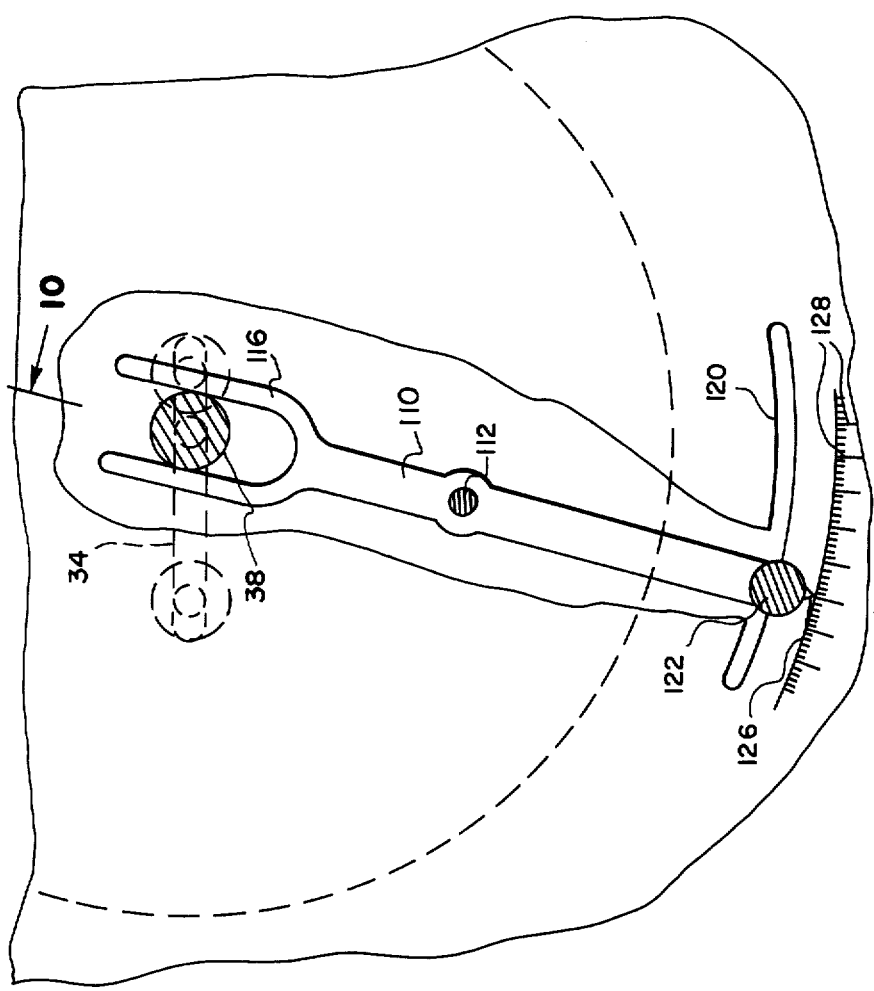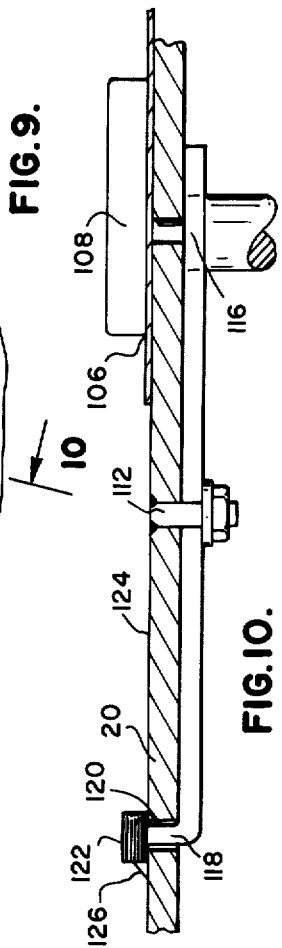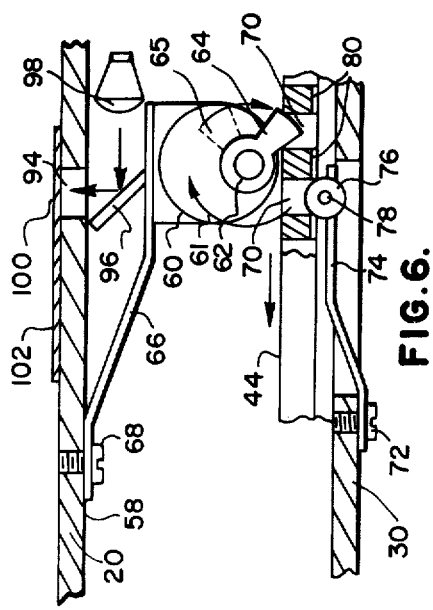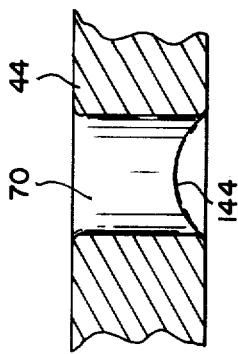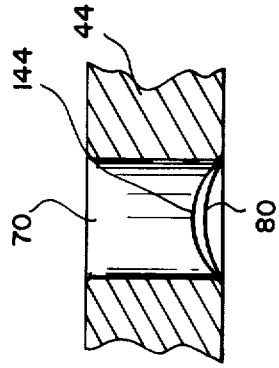

3,933,413

DRIVE MECHANISM FOR A SPIRAL ARRAY OF INDIVIDUAL FILM PHOTOGRAPHS

BACKGROUND OF THE INVENTION

Various mechanisms have been used to drive and index spiral arrays of individual film photographs, and these mechanisms have either been costly to produce or complicated to operate and control and have also lacked simple mechanisms for precision indexing and advancement of a spiral array of individual photographs for successive exposure thereof and projection thereof onto a viewing surface such as a screen or the like. Many of the prior art mechanisms have been devoted to short run movies and are not particularly adapted for use in displaying individual slides as they relate to recorded commentaries directed to the subject matter displayed by individual photographs.

PRIOR ART

The prior art contains several patents of which the following are known to applicant:
U.S. Pat. No. 594,094
U.S. Pat. No. 1,092,053
U.S. Pat. No. 1,208,573
U.S. Pat. No. 1,236,819
U.S. Pat. No. 2,093,033
U.S. Pat. No. 3,450,468

SUMMARY OF THE INVENTION

The present invention relates to a novel rotary driving plate having a spiral array of switch operating portions and a corresponding spiral track, together with a motor carrying a pawl adapted to engage and drive the rotary driving plate in relation to the spiral array of switch operating portions which operate a switch and cause momentary denergization of the motor so that its output shaft drives the pawl a single revolution thereby moving the rotary driving plate from one indexing portion to another while the rotary driving plate carries the photograph mount having a spiral array of photographs corresponding to the spiral array of switch operating portions carried by the rotary driving plate. The rotary driving plate is mounted to rotate on a frame and it is coupled to a rotary axis means which is guided by a rectilinear guide on the frame so that the rotary driving plate may be rotated and concurrently moved in a direction laterally of its rotary axis so that individual photographs on the photograph mount carried by the rotary driving plate may be successively exposed to a light source and through a projector means for exposing and displaying each individual photograph as desired.

The rotary driving plate of the invention is provided with a spiral array of openings therein which constitute the aforementioned switch operating portions and these openings are engaged successively by a track following roller stationarily mounted on the frame of the invention which roller operates to engage the individual openings and traverses recess track portions between the individual openings thereby constituting a spiral track which is interconnecting the openings. The recess spiral track actuates the motor controlling switch in one direction, while the indexing roller when it falls into one of the openings actuates the switch in an opposite direction. The opposite direction being a closed position of the switch which functions in cooperation with a latching relay of the circuit which energizes the motor, and causes it to rotate an actuating pawl one revolution during which time the track followers moved into one of the recess portions and said switch thereby deenergizes the motor. The high reduction gear train interconnecting the motor and the actuating pawl is such as to allow the pawl to coast to a stop as it rotates after the motor is de-energized and such that each energization of the motor by engagement of the track follower in the recessed track means causes the motor to be deenergized and coast to a stop leaving the pawl in position for reentry into one of the openings in the spiral array and to thereby move the spiral array of openings from one opening to the next in succession. The circuit to motor and the aforementioned switch includes a manual switch for initially energizing the motor momentarily whereupon the track follower operating switch de-energizes the motor.

The track following and indexing roller does a combined function of indexing each respective opening in the spiral array and at the same time, engaging the track between the openings so as to move a rotary axis means of the rotary driving plate in a rectilinear path along rectilinear bearing means carried by the frame. Thus the track following roller serves two functions concurrently, while the motor or pawl actuating means operates a pawl for a single revolution as controlled by the track follower operated switch.

The invention also comprises a novel indicator arm adapted to move the rotary driving plate of the invention and its rotary axis means in a rectilinear path along the rectilinear guide means hereinbefore described, such that the pivotal movement of the indicator arm relative to the frame causes a pointer end of the arm to traverse an arcuate path along which incremental indicia is disposed so that the manual operation of the indicator arm allows the operator to determine the shifting of the spiral array of photographs carried by the photographic mount connected to the rotary driving plate such that the operator can determine positions for resetting the spiral array in order to expose any one of a great number of photographs thereof.

The invention also comprises novel annular stop means at the periphery of the rotary driving plate and also spiral stop means around the middle portion of the rotary driving plat so that manual resetting of the rotary driving plate by the indicator arm may be limited to movement so that it will not pass beyond a position of the innermost spiral or the outermost spiral array of indexing portions which may be engaged by the indexing and track following mechanism of the invention.

Additionally, the invention comprises an inner spiral array of indexing portions which are so recessed that the track following roller which actuates the motor control switch will traverse deep recesses and constantly hold the motor energized until the motor has actuated the rotary driving member a distance to traverse several of the spiral array of indexing portions near the center of the rotary driving plate and automatically to arrive at a start position corresponding to an inner spiral array of photographs carried by the photograph mount of the invention.

The combined track following and indexing roller of the invention is resiliently mounted on the frame and urged toward the rotary driving plate so that the track following roller is urged into indexing recesses as well as interconnecting recess track portions and thereby creating sufficient following force to move the rotary driving plate together with the rotary axis means and the photographic mount, in a direction laterally of the rotary axis of the rotary axis means as the rotary driving plate is rotated successively by the power operated or motor actuated pawl which rotates the rotary driving plate.

The hereinbefore described drive mechanism is particularly adapted for use in conjunction with projectors adapted for display and recorded commentary relative to various subjects. The mechanism containing a photograph mount capable of carrying a substantial number of photographs, as for example, a six inch diameter photographic mount may carry as many as 150 individual photographs which may be readily and easily indexed with a light source and projector by means of the drive mechanism of the invention. The invention lends itself readily to very simple and economical slide projectors of a very reliable and easily operated character. The mechanism is particularly simple and precise, as well as being subject readily to manual or motorized movements of the rotary driving plate so that the mechanism can be used with automatic sequencing means and verbal recordings or may be reset manually to view or review various photographs of a substantial number available for display on a single photograph holder or mount. The rotary driving plate as well as the photograph mount may be easily and readily moved by an indicator arm while the indexing roller of the invention held stationarily on the frame is cammed into and out of indexing openings in the rotary driving member as it is moved laterally on its axis proceeding in either direction from the center outward or from the center inward. Thus the mechanism may be readily reset manually and these features in combination with the simple drive and indexing means provided by the resiliently mounted indexing roller and the single revolution motor driven pawl, provide for versatility in the projection of a great number of pictures in a very compact machine.

Accordingly, it is an object of the invention to provide a very simple and compact mechanism for use in connection with a projector in displaying any one of a great plurality of translucent photographs arranged in a spiral array on a photograph mount.

Another object is to provide a very simple drive mechanism for a spiral array of individual film photographs which is very versatile in its ease of manual resetting as well as motor drive capabilities.

Another object of the invention is to provide novel indexing and switch operating means for operating the rotary driving plate by means of a motor and for correspondingly indexing any one of a substantial spiral array of translucent photographs.

Another object of the invention is to provide a very compact drive mechanism and spiral array of photographs which may be carried on a very thin mount to provide for the simple storage and display of a great amount of photographic information in a very compact and readily portable means.

Another object of the invention is to provide a very simple drive mechanism for a spiral array of individual film photographs complying a novel indexing and track following mechanism which indexes various individual photographs in a spiral array and also motivates a rotary driving plate on a rectilinear bearing means laterally of the rotary axis of the driving plate and the spiral array of photographs, thereby providing a very simple mechanism usable in combination with a motor driven single revolution pawl which is activated by a switch controlled by the track following and indexing mechanism for each cylce of operation of the motor which operates on a single revolution function for each energization.

Another object of the invention is provide a very simple drive mechanism for a spiral array of individual film photographs employing novel reset indicator lever means which may be used accurately to select for projection any one of a plurality of photographs in a spiral array.

Further objects and advantages of the invention may be apparent from the following specification, appended claims and accompanying drawings.

BRIEF DESCRIPTION OF THE DRAWINGS

FIG. 1 is a vertical sectional view of a drive mechanism for a spiral array of individual film photographs showing portions of the structure fragmentarily and in section to amplify the illustration;

FIG. 2 is a fragmentary bottom plan view taken form the line 2—2 of FIG. 1;

FIG. 3 is a sectional view taken from the line 3—3 of FIG. 2;

FIG. 6 is a fragmentary sectional view taken from the line 6—6 of FIG. 1;

FIG. 7 is an enlarged fragmentary sectional view taken from the line 7—7 of FIG. 5;

FIG. 8 is another enlarged fragmentary sectional view taken from the line 8—8 of FIG. 5;

FIG. 9 is a fragmentary plan view taken from the line 9—9 of FIG. 1 showing portions of the mechanism broken away to disclose a reset indicator arm of the invention;

FIG. 10 is a fragmentary sectional view taken from the line 10—10 of FIG. 9; and FIG. 11 is a simple diagramatic view of the driving motor of the invention in circuit with a latching relay and an automatic indexing switch and a manual switch together with a reversing switch.

DESCRIPTION OF THE PREFERRED EMBODIMENTS

Figure 5:
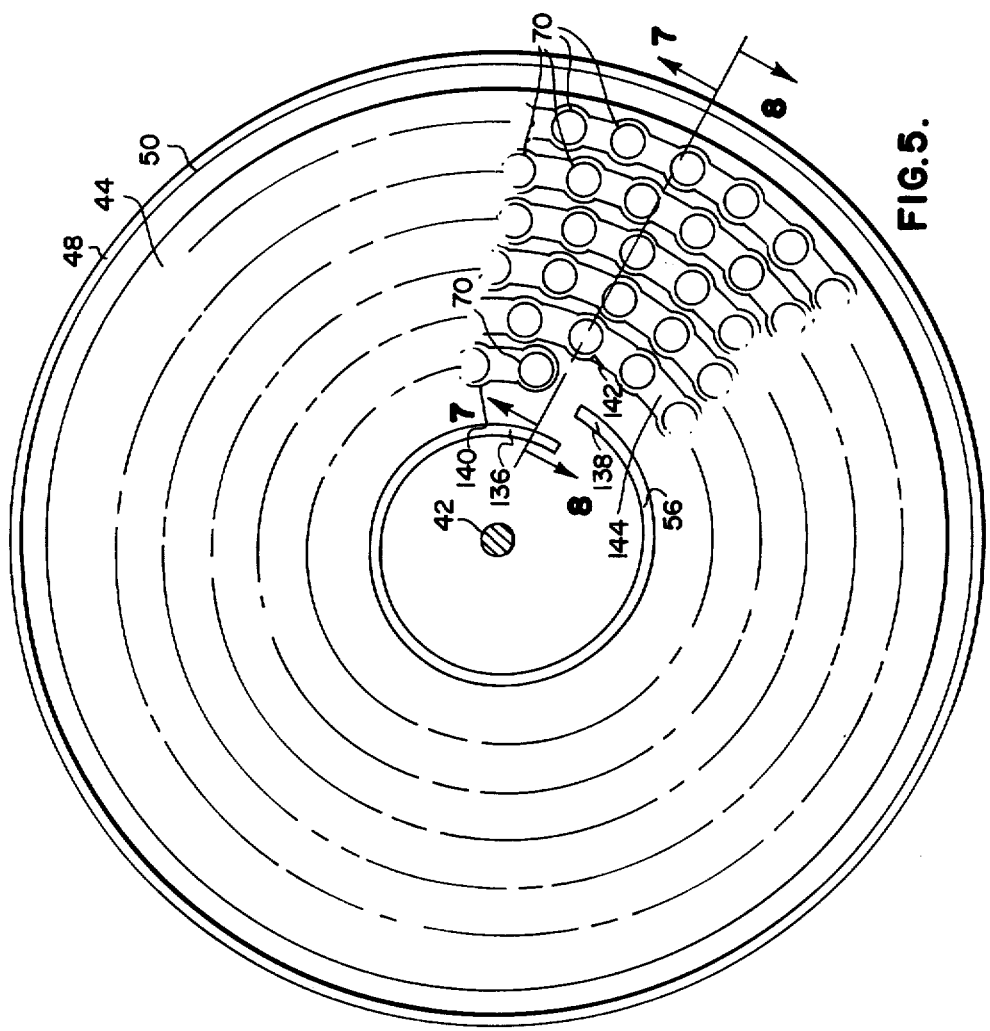
FIG. 5 is a bottom plan sectional view taken from the line 5—5 of FIG. 1 showing a rotary driving plate of the invention.

As shown in FIG. 1 of the drawings, the drive mechanism for a spiral array of individual photographs in accordance with the present invention is provided with a pair of superimposed frame plates 20 and 30 respectively. These frame plates are fixed together by conventional means not shown, but are held in juxtaposition by interconnecting structure such as members 32 shown in FIG. 1 of the drawings.

The frame plate 20 and the frame plate 30 are each provided with respective rectilinear guide bearings slots 34 and 36. These slots are similar and the slot 36 shown in FIG. 2 is representative of the shape of these rectilinear guide bearings in the frame plates 20 and 30.

A rotary axis bearing means 38 is provided with a pair of trunnions 40 and 42 which are rotatable and movable in the rectilinear guide bearing slots 34 and 36. The rotary axis means 38 is fixed to a rotary driving plate 44 which is generally circular and provided with a central portion 46 and a periphery 48. Refering to FIG. 5 of the drawings, it will be seen that the rotary driving plate 44 is provided with a downwardly directed annular stop ledge 50 which bears on an upper surface 52 of the frame plate 30. The rotary driving plate 44 surrounding a middle portion 54 thereof, is provided with a spiral stop ledge 56 which also bears upon the upper surface 52 of the frame plate 30. Thus the rotary driving plate 44 is slidable and rotatable on the upper surface 52 of the frame plate 30; and mounted on a lower surface 58 of the frame plate 30 is a reduction gear motor 60 having an output shaft 62 carrying a pawl 64 shown best in FIG. 6 of the drawings. The motor 60 is mounted on a plate spring 66 secured by a screw 68 to the lower surface 58 of the frame plate 20. The spring mount 66 provides resilient flexing action of the motor to compensate for initial misalignment of the pawl 64 as it approaches one of the openings 70 in the rotary driving plate 44.

The openings 70 are disposed in a spiral array and when the pawl 64 passes into one of the openings 70 as shown in FIG. 6, the rotary driving plate is rotated about the rotary axis 39 of the rotary axis means 38; and in the event that the pawl 64 does not readily pass into one of the openings 70, the spring mount 66 flexes until the pawl moves far enough in a rotary direction to drop into one of the openings 70, all as will be hereinafter described in detail.

Mounted on the frame plate 30 by means of screws 72, is a plate spring 74 on which a track following roller 76 is rotatably mounted by means of an axle 78. The axle 78 is direct substantially radially with respect to the axis of the rotary axis means 38; and this roller 76 is adapted to be urged resiliently by the spring mount 74 into one open end of one of the holes 70, the holes passing all of the way through the rotary driving plate 44, all as shown best in FIG. 6 of the drawings.

As shown in FIG. 6, it will be seen that the track following roller 76 engages in opposite ends of the holes 70 from which the pawl 64 enters and leaves, all as indicated by an arrow and broken lines in FIG. 6.

Extending between the holes 70 are recess track portions 80, as shown best in FIGS. 6, 7, and 8. These recessed spiral track portions interconnecting all of the indexing openings 70 provide for the indexing of one of the openings 70 in a particular position relative to the frame and also for the motivation of the rotary driving plate 44 in a direction laterally of its axis within the rectilinear guide slots 34 and 36 hereinbefore described. The motor 60, together with its reduction gear box 61, is controlled by a switch 82 fixed to the frame by a bolt 84. This switch 82 as shown best in FIGS. 2 and 3 of the drawings, is provided with a plunger 86 which bears on a lower surface 88 of the resilient track follower mount 74; and as shown in FIG. 3, the switch 82 is in closed position when the track following roller 76 is in one of the holes 70 and the plunger 86 of the switch 82 is moved in a direction toward the switch 82 when the roller passes out of the opening 70 and into a respective recess track portion 80 hereinbefore described.

When the pawl 64 is driven by the motor 60 in the direction of the arrow 61 in FIG. 6 of the drawings, the pawl 64 first enters one of the openings 70 and thereby rotates the rotary driving plate about its rotary axis 39 until the pawl 64 passes out of the opening and coasts to a stop in a broken line position 65 shown in FIG. 6 of the drawings. It being noted that when the pawl 64 rotates the rotary driving plate to a position wherein the recessed track portion 80 moves the roller 76 out of the respective opening 70, the switch 82 is opened de-energizing the motor and due to the high reduction ratio of the gear train 61, the motor coasts to a stop with the pawl 64 in the position approximately as shown by broken lines 65 in FIG. 6 of the drawings.

Referring to the schematic FIG. 11, it will be seen that the switch 82 is by-passed by a manually or otherwise operable switch 90 which may be used momentarily to energize the motor 60 through a latching relay 91 whereupon the switch 82 is activated as hereinbefore described, de-energizing the motor and additionally, a reversing switch 92 is provided for reversing the direction of rotation of the pawl 64 and resultant rotation of the rotary driving plate 44 so that the driving mechanism of the invention may be spaced back to dispose a desirable photograph in position for projection as will be hereinafter described.

The frame plate 20 is provided with a rectangular opening 94 below which a mirror 96 is disposed to receive light from a light source 98. The light is projected by the mirror upwardly through a translucent photograph 100 carried by a disc shaped photograph mount 102.

Figure 4:
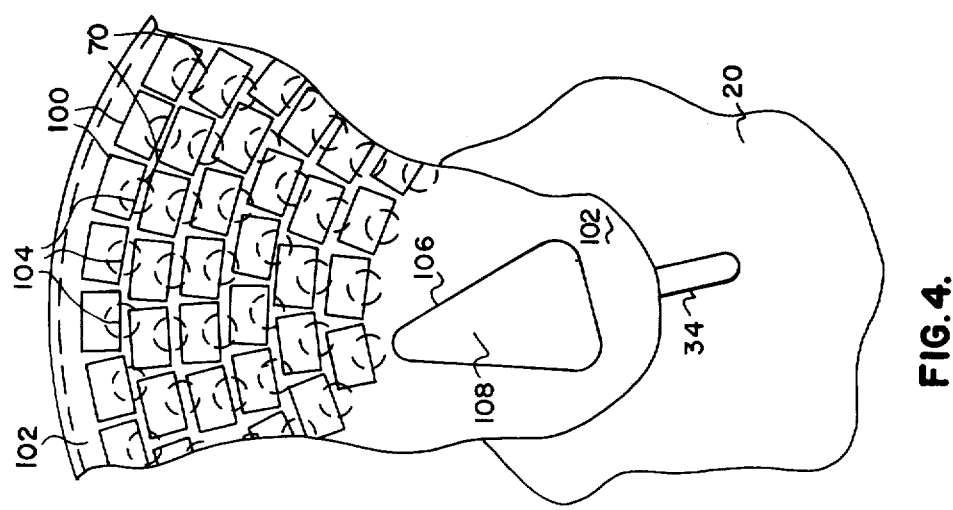
FIG. 4 is a fragmentary top or plan view taken from the line 4—4 of FIG. 1 showing the relative disposition of individual photographs of a spiral array directly related to indexing portions of a rotary driving plate coupled to the spiral array of photographs which are carried by a photograph mount.

The photograph mount 102 is shown in FIG. 1 and 4 and the individual photographs 100 are arranged in a spiral array directly corresponding to the openings 70 in the rotary driving plate 44.

It will be seen that each photograph 100 is provided with an edge 104 directed toward a middle portion of the photograph mount 102 and that the middle portion of each individual photograph 100 is substantially aligned with or related to a center of one of the openings 70 in the rotary driving plate 44. The centers of the openings 70 and the median edge portions 104 are all equally spaced so as to provide for equal spacing of the individual photographs 100 which are individually disposable above the mirror 96 and over the opening 94 so that light may be projected through the translucent photographs and to a suitable projecting lense which is no part of the present invention.

It will be understood that the median portion of the inner edge of each photograph is related to a center of each respective openings 70, however, some offset relationship may occur without departing from the operative relationship. Therefore, each photograph is related to one of the openings 70.

It will be seen that the openings 70 are all equally spaced from the inner portion of the spiral array to the outermost portion of the spiral array, and that the openings are also spaced radially outward in a substantially equal spacing from the inner spiral array to the outer spiral array. Thus the photographs 100 have their adjacent innermost edges substantially contiguous with the adjacent sides slightly diverging outward toward the periphery of the photograph mount 102.

The photograph mount plate is provided with a triangular opening 106 which is fitted over a triangular knob 108 carried on the spindle 40 of the rotary axis bearing means which is fixed to the rotary driving plate 44.

Any one of a great number of the photographs mounts may be placed over the triangular driving knob 108 and held in juxtaposition as hereinbefore described, relative to the indexing openings in the rotary drive plate 44. Thus, indexing by means of the pawl 64 and roller 76 may correspond directly, all as shown best in FIG. 4 of the drawings.

An indicator arm 110 is pivotally mounted by means of a pin 112 extending from a lower surface 114 of the upper frame plate 20. This arm 110 at one end is provided with a bifurcated yoke 116 straddling the rotary axis means 38 and the opposite end of the pointer lever 110 is provided with an angularly disposed portion 118 extending upward through a slot 120 in the frame plate 20 and a manual knob 122 is disposed above the upper surface 124 of the frame plate 20 and this manual knob 122 is adapted to be operated to dispose a pointer portion 126 of the knob 122 in correspondence with graduation indicia 128 on the upper surface of the frame plate, all as shown best in FIG. 9 of the drawings.

It will be seen that the bifurcated portion 116 of the indicator lever arm 110 is capable of moving the bearing axis means 38 together with the rotary driving plate 44 and the knob 108 in a rectilinear path of the rectilinear bearing means 34 and 36 so as to cause the roller 76 to snap in and out of various openings 70 as the rotary driving plate 44 is moved relative to stationary roller 76.

As the rotary driving plate is moved in a direction of an arrow A in FIG. 1 of the drawings, an inner surface 130 of the annular stop 50 contacts a respective edge 132 of the indexing roller mount 74. When in this position the outer spiral array of openings 70 is substantially alinged with the indexing roller 76.

When the rotary driving plate 44 is moved in the direction of the arrow B, as shown in FIG. 1, the spiral stop 56 is engaged by an edge 134 of the indexing roller mount 74 and this places the inner spiral array of openings 70 in alignment with the indexing roller 76.

Referring to FIG. 5 of the drawings, it will be seen that the spiral stop 56 is provided with an end portion 136 and an opposite end portion 138. The end portion 36 is adjacent to an opening 70 at a location 140 and the end portion 138 of the spiral stop 56 is located adjacent to one of the openings 70 at a location 142.

The rotary driving plate 44 between the openings at the locations 140 and 142 is provided with deep recessed track portions as shown in FIG. 8 and designated 144. These track portions are substantially deeper than the track portions 80 hereinbefore described, and allow the roller 76 to be in a depressed position wherein the plunger 86 of the switch 82 holds the switch closed and maintains the motor 60 energized. Accordingly, the motor will continue to energize and move the pawl 64 continuously until all of the inner spiral array of openings have been traversed from the openings 70 at the location 140 to the openings 70 at the location 142. Whereupon, the spiral track between the openings 70 at the location 142 and another opening 70 at a location 144 is the spiral track 80 as shown which raises the indexing roller 76 sufficiently to open the swithc 82 and de-energize the motor 60 which allows the pawl 64 to coast to its broken line position 64 ready for the next indexing operation.

It will be appreciated by those skilled in the art that various modifications of the invention may be resorted to without departing from the spirit of the invention.

I claim:

1. In a drive mechanism for a spiral array of individual film photographs wherein the spiral array of individual photographs are carried by a photograph mount, the combination of: a frame; a rotary driving plate movably mounted on said frame; a photograph mount having a spiral array of individual translucent photographs; means coupling said rotary driving plate and said photograph mount and adapted to rotatably drive said photograph mount; said rotary driving plate having a spiral array of switch operating portions; each of said switch operating portions disposed in corresponding relationship to one of said translucent photographs; a stationary switch mounted on said frame and disposed to be intermittently and successively actuated by said switch operating portions of said rotary driving plate; a power operated means mounted on said frame and coupled to said switch and adapted to be intermittently energized by said switch; a pall driven by said power operated means; a spiral array of pall engaging portions carried by said rotary driving plate and disposed to be individually engaged by said pall for rotating said rotary driving plate; said pall engaging portions each disposed and corresponding with one of said photographs and corresponding ones of said switch operating portions (portion).

2. The invention as defined in claim 1 wherein rotary axis means is coupled to said plate; a stationary frame; rectilinear guide means on said frame; said rotary axis means moveably mounted by said rectilinear bearing means such that said rotary axis means and said rotary driving plate are disposed to move relative to said frame in a direction laterally relative to the rotary axis of said rotary axis means.

3. The invention as defined in claim 2 wherein a indicator arm is pivotally mounted on said frame and engagable with said rotary axis means for moving said rotary axis means and said rotary driving plate rectilinearly along said rectilinear bearing means; said indicator arm having one end engagable with said rotary axis means and an opposite end provided with a pointer, said indicator arm pivotally mounted on said frame between said ends; indicia located on said frame on an arcuate path traversed by said pointer portion of said indicator arm and adapted to indicate the disposition of said photographic mount and particularly individual photographs thereon in correspondence to their position relative to said frame.

4. The invention as defined in claim 2 wherein said rotary driving plate is provided with spiral track means; said spiral track means corresponding to said spiral array of photographs; track follower means stationarily mounted on said frame and adapted to engage said spiral track means to thereby force said rotary driving plate to move relative to said frame in a rectilinear path of said rectilinear bearing means when said rotary driving plate is rotated by said power operated means and said pawl.

5. The invention as defined in claim 4 wherein said rotary driving plate is provided with opposite sides and a spiral assembly of holes extending therethrough from side to side, each hole having a first open end constituting one of said switch operating portions and each hole having a second open end constituting one of said pawl engagable portions.

6. The invention as defined in claim 5 wherein said rotary driving plate is provided with recess portions recessed in one side of said driving plate; said recess portions interconnecting said first open ends of said holes and constituting said spiral track means.

7. The invention as defined in claim 6 wherein said track follower means comprising an indexing roller; a resilient roller mount for said indexing roller; said roller mount supported stationarily on said frame; said roller mount tending resiliently to urge said indexing roller into said spiral track and into said first open ends of said openings.

8. The invention as defined in claim 4 wherein said switch operating portions constitute openings in said driving plates; said spiral track comprising first spiral recess portions in said driving plate interconnecting adjacent ones of said openings; said track follower means being a roller resiliently mounted on said frame and tending to engage said openings and said spiral recess portions and acting as a detent in each respective opening and acting in said spiral recesses to move said rotary driving plate in said rectilinear path.

9. The invention as defined in claim 8 wherein said openings constitute said switch operating portions of said driving plate; said switch operated by said roller as it is forced into each of said openings.

10. The invention as defined in claim 9 wherein said first spiral recess track portions are shallower than said openings so as to actuate said switch oppositely with respect to the actuation of said switch when said roller is forced into one of said openings.

11. The invention as defined in claim 8 wherein said rotary driving plate is provided with a central portion; a spiral stop surrounding said central portion and stop engaging means engagable by said spiral stop for limiting rectilinear movement of said driving plate in a first direction.

12. The invention as defined in claim 11 wherein said rotary driving plate is provided with a peripheral annular stop engagable with said stop engaging means for limiting rectilinear movement of said driving plate in a second direction relative to said frame.

13. The invention as defined in claim 12 wherein said spiral stop and said annular stop correspond generally and respectively with inner and outer spiral arrays of said openings.

14. The invention as defined in claim 11 wherein said openings constitute said switch operating portions of said driving plate; said switch operated by said roller as it is forced into each of said openings; said rotary driving plate having deep recessed track portions interconnecting with said openings of an innermost spiral array of said openings nearest a middle portion of said rotary driving plate whereby said switch is operated during disposition of said roller in said deep recess track portions.

15. The invention as defined in claim 1 wherein said power operated means comprises: a reduction gear motor having a low speed output shaft; said pawl carried by said shaft in position to engage one of said pawl engagable openings for driving said rotary driving plate during a partial revolution of said shaft.

16. The invention as defined in claim 1 wherein said rotary driving plate is provided with a spiral array of individually recessed portions; track portions recessed between said individually recessed portions and being shallower than said individually recessed portions; an indexing member mounted on said frame in stationary position thereon resilient means tending to force said indexing member successively into said individual recess portions and said track portions whereby said indexing member successively engages said indexing recesses and said spiral track portions during rotary movement of said driving plate by said power operated means and said pawl; whereby said indexing member is constantly engaged in either the individual spiral recesses or the spiral track portions thereby individually indexing said rotary driving plate in various positions corresponding to said photographs and also said indexing member tending, due to said spiral track means, to force said rotary drive plate to move in a rectilinear path along said rectilinear bearing means.

17. The invention as defined in claim 1 wherein the alignment of said individual photographs with a given position on said frame correspond with said switch operating portions of said rotary driving plate; said switch operating portions being circular openings in said driving plate; said individual photographs being rectangular and having edges directed toward a center of said photographic mount and said rotary driving plate; said edges having middle portions related to centers of respective ones of said circular openings.

18. The invention as defined in claim 17 wherein said circular openings are disposed and spaced from each other such that centers of said circular openings are equally and uniformally spaced from each other throughout said spiral array in order to provide uniform equal spacing for corresponding movement of said individual photographs relative to an exposure position on said frame.

19. In a drive mechanism for a spiral array of individual film photographs wherein the spiral array of individual photographs are carried by a photograph mount, the combination of: a rotary driving plate; a photograph mount having a spiral array of individual translucent photographs thereon; means coupled to said rotary driving plate and adapted to rotatably drive said photograph mount; said rotary driving plate having a spiral array of switch operating portions; each of said switch operating portions being related to a corresponding one of said translucent photographs; a stationary switch disposed to be intermittently and successively actuated by said switch operating portions of said rotary driving plate; a power operating means coupled to said switch and adapted to be intermittently energized by said switch; a pawl driven by said power operated means; a spiral array of pawl engageable portions carried by said rotary driving plate and disposed to be individually engaged by said pawl for rotating said rotary driving plate; said pawl engageable portions being related to corresponding ones of said photographs and corresponding ones of said switch operation portion; rotary axis means is coupled to said plate; a stationary frame; rectilinear guide means on said frame; said rotary axis means moveably mounted by said rectilinear bearing means such that said rotary axis means and said rotary driving plate are disposed to move relative to said frame in a direction laterally relative to the rotary axis of said rotary axis means; said rotary driving plate is provided with spiral track means; said spiral track means corresponding to said spiral array of photographs; track follower means stationarily mounted on said frame and adapted to engage said spiral track means to thereby force said rotary driving plate to move relative to said frame in a rectilinear path of said rectilinear bearing means when said rotary driving plate is rotated by said power operated means and said pawl; said rotary driving plate is provided with opposite sides and a spiral assembly of holes extending therethrough from side to side, each hole having a first open end constituting one of said switch operating portions and each hole having a second open end constituting one of said pawl engageable portions; said rotary driving plate is provided with recess portions recessed in one side of said driving plate; said recess portions interconnecting said first open ends of said holes and constituting said spiral track means; said track follower means comprising an indexing roller; a resilient roller mount for said indexing roller; said roller mount supported stationarily on said frame; said roller mount tending resiliently to urge said indexing roller into said spiral track and into said first open ends of said openings: said switch is disposed to be operated by movement of said roller mount as said indexing roller moves into and out of said first open ends of said openings.

20. In a drive mechanism for a spiral array of individual film photographs wherein the spiral array of individual photographs are carried by a photograph mount, the combination of: a frame; a rotary driving plate movably mounted on said frame; a photograph mount having a spiral array of individual translucent photographs thereon; means coupling said rotary driving plate and said photograph mount and adapted to rotatably drive said photograph mount; said rotary driving plate having a spiral array of switch operating portions; each of said switch operating portions disposed in corresponding relationship to one of said translucent photographs; a stationary switch mounted on said frame and disposed to be intermittently and successively actuated by said switch operating portions of said rotary driving plate; a power operating means mounted on said frame and coupled to said switch and adapted to intermittently be energized by said switch; and further means intermittently operable by said power operated means for moving said rotary driving plate; the individual switch operating portions of said spiral array being equally spaced in a spiral direction as well as a radial direction; each of said translucent photographs being rectangular and having edges directed toward the middle of said photograph mount and a median portion of each of said edges being related to the respective one of said switch operating portions; said photographs having side edges closely adjacent each other at said first mentioned edges and said side edges being disposed in a slightly diverging relation toward the outer most portion of said photograph mount; said individual switch operating portions of said spiral array being equally spaced in a spiral direction as well as in a radial direction so as to provide for a maximum number of film photographs on said photograph mount in relation to the spiral array of switch operating portions on said rotary driving plate.

* * * * *